Patented Mar. 14, 1933

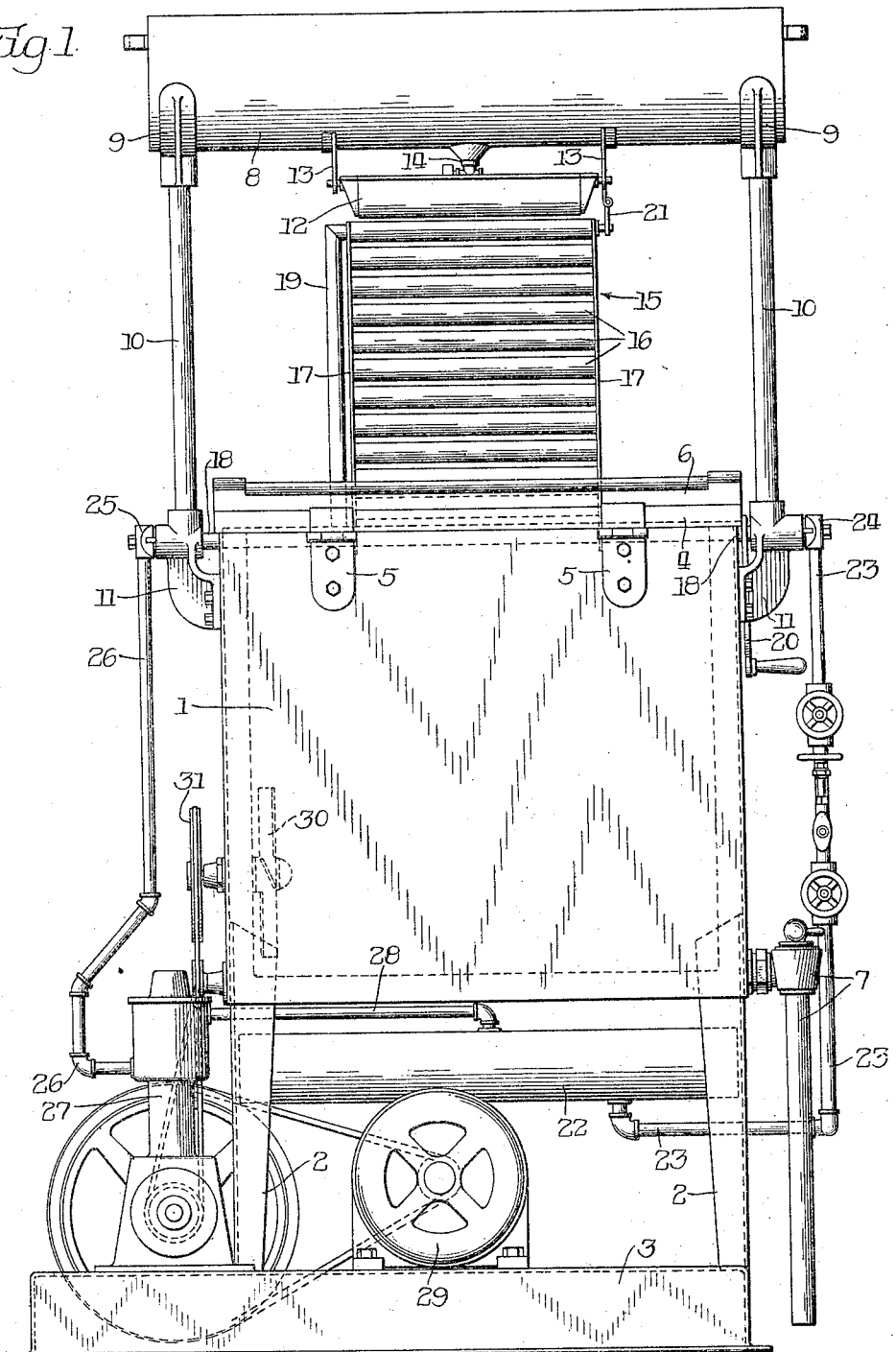

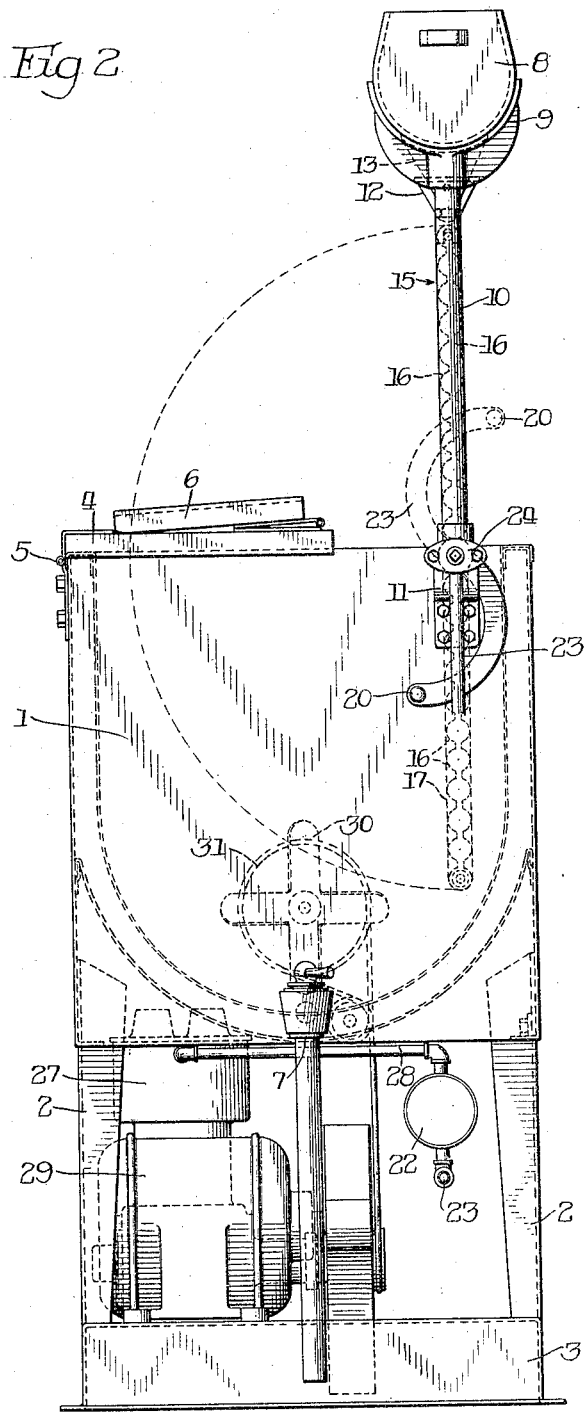

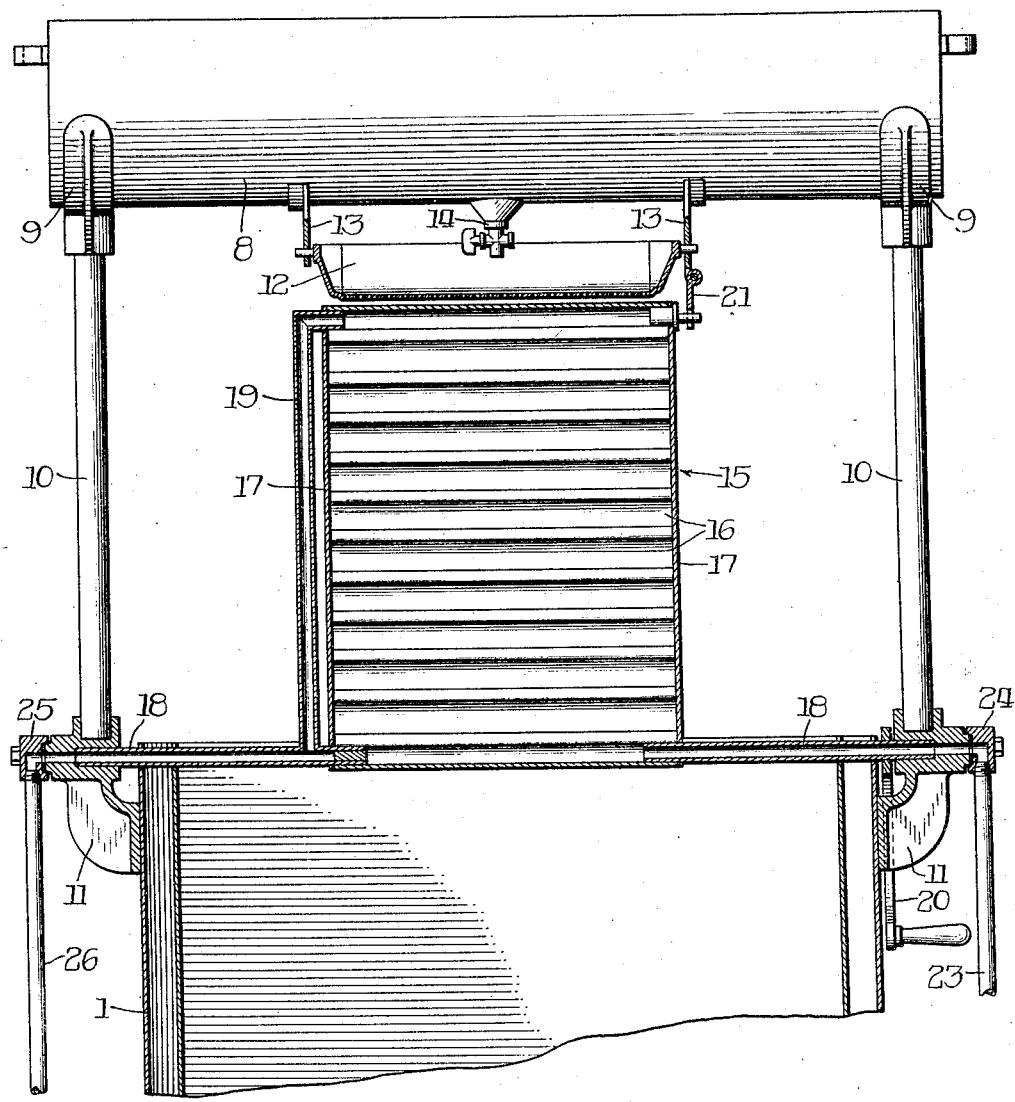

1,901,014

UNITED STATES PATENT OFFICE

GEORGE E. WALLIS, OF EVANSTON, ILLINOIS, ASSIGNOR TO THE CREAMERY PACKAGE MFG. COMPANY, OF CHICAGO, ILLINOIS, A CORPORATION OF ILLINOIS

MILK COOLING AND STORING APPARATUS

Application filed June 12, 1931. Serial No. 543,832.

The invention relates to milk coolers and storing tanks adapted for use on dairy farms for removing the animal heat in milk after milking and for storing the milk at a cold temperature until transported to market.

The object of the invention is to provide a combined cooler and storage tank, of simple compact construction, having self contained mechanical refrigeration, and in which a cooling unit serves both to extract the heat from the warm milk before it enters the tank and to maintain a cool temperature in the milk while it is stored in the tank.

Other objects and advantages will be apparent in the following detailed description of a preferred embodiment of the invention illustrated in the accompanying drawings, in which Fig. 1 is a side view in elevation, Fig. 2 is an end view in elevation, and Fig. 3 is a partial sectional view in elevation.

Referring to the drawings, the numeral 1 indicates a tank or vat preferably having a round bottom and insulated double walls, and being open at the top. The tank is supported on legs 2, secured to a skirt extension of the outer walls of the tank and to a base 3. A two-part cover is provided, of which one section 4 is hinged to a side wall of the tank, as at 5, and another section 6 is hinged to the first section. The tank is provided at the bottom with a valved outlet and discharge pipe 7.

Mounted above the opening provided by the turning back of the cover section 6, is a smaller open top receiving or dump tank 8, preferably removably supported in a pair of saddles 9 respectively mounted on a pair of upright standards 10 secured in brackets 11 mounted on the outer end walls of the main tank. A distributing trough 12 is suspended from the underside of the receiving tank 8, as by hangers 13. A valved outlet 14 is provided in the bottom of the tank 8, for discharge into the trough 12, and the V shaped bottom of the latter is provided with a longitudinal series of small discharge openings.

Directly beneath the trough is a cooler 15, preferably comprising a pair of spaced plates 16 having parallel horizontal corrugations simulating tubes and laterally sealed and supported upon side plates 17, the corrugated plates being joined at top and bottom, thus forming between them a passage for the circulation of a refrigerant while milk flows down over the outer surfaces of the plates 16 from the distributing trough 12 and into the tank 1.

The cooler unit 15 is swingably supported at one end by a pair of laterally extending alined tubular stub shafts 18 endwardly fixed to the side plates 17 and having operative bearing in bores provided respectively in the brackets 11. The tubular shafts provide the connections for the circulation of the refrigerant through the cooler, one only of the shafts opens directly into the internal space between the plates 16, and the other shaft is connected to the opposite end of the cooler by a tube 19. Attached to one of the stub shafts is a crank handle 20, by which the cooler 15 may be swung manually from the position shown in Fig. 1 to a position within the tank 1, as shown in broken lines in Fig. 2. Both covers 4 and 6 may be closed over the tank when the cooler is in such lower position. The cooler may be retained in upper position by means of a latch 21 pivoted on the hangar 13 and operable to engage a stud fixed on the adjacent end of the cooler.

Refrigerant is supplied to the cooler from a conventional shell condenser 22, through pipe line 23 and suitable control valves, to a fitting 24 mounted on the bracket 11 in sealed communication with the bore in which one of the tubular shafts 18 has its bearing. A similar fitting 25 establishes communication between the other tubular shaft and a suction pipe line 26 leading to a compressor 27 wherein the refrigerant is recompressed and returned through the pipe 28 to the condenser. The compressor is driven preferably by a motor 29 belted thereto. Agitation of the contents of the tank may be attained by a rotary agitator 30 mounted on a shaft extending through a suitable bearing in the end wall of the tank and carrying a pulley 31 driven by belt also from the motor 29.

In operation, the cooler is first placed in upper position. The warm milk is poured into the receiving tank, from where it flows down over the cooler into the storing tank with the animal heat removed. At the finish of the milking, the cooler is turned down into the storing tank and immersed in the milk, the sectional cover being closed thereover. The circulation of refrigerant through the cooler being maintained in both positions, the temperature of the milk in the tank is held at the desired degree for its best preservation until the time of its transport to market.

The dual purpose of extracting the animal heat from each milking before it is mixed with that previously cooled, and the maintenance of a cold temperature in the milk being stored, is accomplished by a single cooler unit advantageously adapted to the double use, with great economy in cost of apparatus necessary to so handle the milk. The combined unit of cooler, storing tank and common refrigerating means is compact, simple and easy of operation and maintenance.

While I have illustrated and described the cooler as swinging upon a pivotal support, I have in mind that the same end may be accomplished by providing flexible or telescoping refrigerant connections and supporting the cooler for sliding movement between upper and lower positions.

I claim as my invention:

1. Milk cooling and storing apparatus, comprising, a tank, a cooler mounted thereon, means for positioning said cooler alternatively outwardly of said tank and within said tank, means for directing a flow of milk over said cooler in outward position for entry into said tank, and means for supplying refrigerant to said cooler, said cooler being partially immersed in said milk when within said tank.

2. Milk cooling and storing apparatus comprising, a storing tank, a cooler, means for supporting said cooler in alternative positions above said tank to cool milk before entering said tank and within said tank to maintain low temperature in the milk contained therein, and means for delivering milk to said cooler when in position above said tank.

3. Milk cooling and storing apparatus comprising, a storing tank, a cooler, supporting means for said cooler, said means being operable to move said cooler into and out of said tank, milk receiving means adapted to supply milk to said cooler when said cooler is in outward position, and means for supplying refrigerant to said cooler in either position.

4. Milk cooling and storing apparatus comprising, a storing tank, a cooler, a tubular shaft operatively supporting said cooler in alternative positions above said tank and within said tank, said shaft having internal communication with said cooler for the circulation of refrigerant through said cooler, and means for supplying milk to said cooler when in position above said tank.

In witness whereof I have hereunto attached my signature.

GEORGE E. WALLIS.